(12) United States Patent
Schneider

(10) Patent No.: US 6,626,203 B1
(45) Date of Patent: Sep. 30, 2003

(54) SANITARY MIXING VALVE

(75) Inventor: Hermann-Josef Schneider, Deutschland (DE)

(73) Assignee: American Standard Inc., Piscataway, NJ (US)

( * ) Notice: Subject to any disclaimer, the term of this patent is extended or adjusted under 35 U.S.C. 154(b) by 0 days.

(21) Appl. No.: 10/030,826

(22) PCT Filed: Jul. 3, 2000

(86) PCT No.: PCT/EP00/06175

§ 371 (c)(1),
(2), (4) Date: Jan. 11, 2002

(87) PCT Pub. No.: WO01/06156

PCT Pub. Date: Jan. 25, 2001

(30) Foreign Application Priority Data

Jul. 20, 1999 (AU) .............................................. 1256/99

(51) Int. Cl.[7] ............................................. F16K 11/074
(52) U.S. Cl. ........................................ 137/270; 251/288
(58) Field of Search ............................... 137/270, 454.5, 137/454.2; 251/284–288

(56) References Cited

U.S. PATENT DOCUMENTS 3,559,684 A * 2/1971 Rudewick, III ............. 251/285
4,093,180 A * 6/1978 Strabala ....................... 251/286
5,326,075 A * 7/1994 Goff ............................ 251/285
5,398,717 A   3/1995 Goncze
5,467,799 A   11/1995 Buccicone et al.
5,494,077 A * 2/1996 Enoki et al. ................. 251/288
5,725,010 A * 3/1998 Marty et al. ................. 137/270
5,826,615 A   10/1998 Ko
5,832,852 A   11/1998 Engelhardt

FOREIGN PATENT DOCUMENTS

EP          0745 798          12/1996

* cited by examiner

Primary Examiner—Paul J. Hirsch

(57) ABSTRACT

A sanitary mixing valve having two valve disks (1, 2) arranged in a cartridge casing (7), one of which is held in a rotationally fixed manner while the other can be moved by means of a driving element (4) provided on a spindle (3) is created, whereby the driving element (94) has at least one stop projection (5, 15) which, in cooperation with at least one stop (6, 26) on the cartridge casing (7), limits the rotational movement of the driving element (4), whereby the driving element (4) consists of a part (8), which is fixedly connected to the spindle (30) and has a gearing (9) in at least one portion of its outer circumference, and a coupling (10), which has on its inner circumferential surface a gearing (11) which, in the installed state, engages the gearing (9) of the fixedly connected part (8) of the driving element (4), whereby the minimum of one stop projections (5, 15) of the driving element (4) is provided on the coupling (10).

8 Claims, 4 Drawing Sheets

SANITARY MIXING VALVE

FIELD OF THE INVENTION

The invention relates to a sanitary mixing valve having two valve disks arranged in a cartridge casing, one of which is held in a rotationally fixed manner while the other can be moved by a driving element provided on a spindle, said driving element consisting of a part, which is connected fixedly to the spindle and has a gearing in at least a portion of its outer circumference, and a coupling, which has on its inner circumferential surface a gearing which, in the installed state, engages with the gearing on the fixedly connected to the spindle part of the driving element, the coupling having at least one stop projection which[, in cooperation with at least one stop,] limits the rotational movement of the driving element in cooperation with at least one stop.

BACKGROUND OF THE INVENTION

With such known mixing valves, such as disclosed in European Patent Application 745,798, U.S. Pat. Nos. 5,467, 799, 5,826,615 and 5,832,952, the position of the movable valve disk is altered in relation to the rotationally fixed valve disk by the turning of the spindle by means of the driving element so that cold water, mixed water or hot water can flow through the valve, depending on the position of the two valve disks relative to one another. In most cases, the movable valve disk can also be brought into a position opposite the fixed valve disk by means of the driving element, causing the valve to be shut off. To maintain the rotational movement of the movable valve disk in the range required for operation of the mixing valve, the driving element has at least one stop projection which, in cooperation with at least one stop on the cartridge casing, limits the rotational movement of the driving element and thus of the movable valve disk. This stop may be equivalent to a temperature limit if it causes mixed water to flow even in the hottest setting, i.e., the cold water opening in the fixed valve disk is not entirely closed. In the case of a fixed disk, however, the temperature of the mixed water coming out of the faucet in the position described last is obtained from the starting temperatures of the hot and cold water and [from] the pressure of the incoming hot and cold water. Due to the fact that the driving element consists of a part, which is fixedly connected to the spindle and having a gearing in at least one area of its outer circumference, and a coupling, which has on its inner circumferential surface a gearing which in the installed state engages the gearing of the fixed part of the driving element, the stop projection on the driving element can be offset by offsetting the coupling with respect to the fixedly connected part of the driving element according to the gearings, and thus the range of rotation of the driving element and the movable valve disk, however, the maximum temperature of the water coming out of the faucet is also changed. According to the pitch of the gearing, this yields a minimal angle of the offset for the stop and the adjustability of the maximum temperature in certain stages. For reasons involving the manufacturing costs and the required robustness of the driving element parts, there is a limit to how thin the teeth may be and thus also to how small the parts may be, and the adjustable gradations in the maximum temperature are not satisfactory.

The object of the present invention is to design a sanitary mixing valve of the type defined in the preamble so that a finer precision in adjustability of the maximum temperature is made possible without greatly increasing manufacturing costs or having a negative effect on the robustness of the driving element parts.

BRIEF DESCRIPTION OF THE INVENTION

This object is achieved according to this invention by the fact that at least one first stop projection extends beyond a portion of the height of the coupling, and at least one second stop projection whose stop surface is offset relative to the stop surface of the first stop projecting, extends over-another portion of the height, and the coupling can be placed on the fixedly connected part of the driving element in two different directions, and the first and second stop projections cooperate alternatively with the stop provided in the cartridge casing.

The offset of the stop surfaces permits intermediate steps between the gradations resulting from the pitch when the coupling is placed on the fixedly connected part of the driving element in the opposite direction.

In the installed state, the fixedly connected part of the driving element together with its area having the gearing preferably projects out of the cartridge casing through a central opening in the cartridge cover, and the coupling is placed on the fixed part from the outside, engaging with the minimum of one stop projection in the orifice in which the sixth stop with the cartridge casing extends radially. The coupling can thus be removed from the fixed part of the driving element, rotated and reattached without having to open the cartridge.

The pitch of the gearing on the outer circumference of the fixedly connected part of the driving element and on the inner circumferential surface of the coupling is preferably 10°. With the usual dimensions and materials used for cartridges of mixing valves, this 10° pitch of the gearing yields an acceptable gradation for adjusting the maximum temperature without any risk of the material of the driving element breaking off in the area of the gearing.

The offset preferably amounts to half the pitch of the gearing on the outer circumference of the fixed part of the driving element and on the inner circumferential surface of the coupling, so that due to this offset, intermediate steps are possible between the steps that are possible due to the gearing, these intermediate steps being located exactly in the middle between two steps according to the gearing.

DETAILED DESCRIPTION OF THE INVENTION

Figure 1:
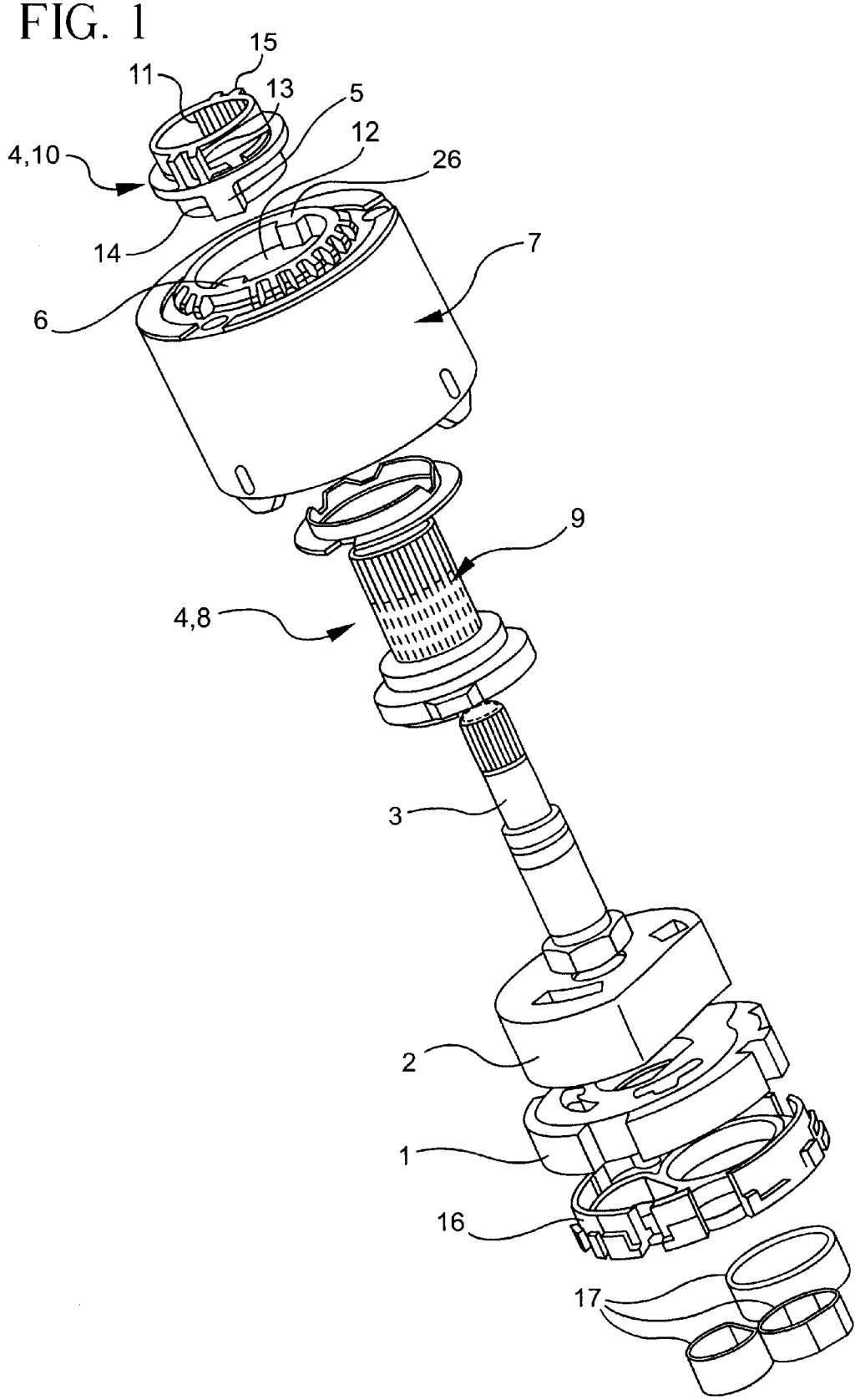
FIG. 1 is an exploded view of a cartridge having a driving element of the invention.

FIG. 1 shows the cartridge casing bottom 16 which comes to lie on the bottom of the fitting casing with the insertion of the gaskets 17 in assembly. A fixed valve disk 1 sits in or on the cartridge casing bottom 16 with a movable valve disk 2 arranged on it, forming a seal. A driving element 4 fixedly arranged on a spindle 3 which also passes through driving element 4 engages in the movable valve disk 2. The driving element 4 comprises a fixed part 8 which has gearing 9 in an area of its outer circumference. This area having the gearing 9 extends through the opening 12 in the cartridge casing 7 in the installed state of the valve. Two stops 6, 26 project radially inward in the opening 12. A coupling 10 is also part of the driving element 4, having gearing 11 on its inside surface, meshing with the gearing 9 of the fixed part 8 of the driving element 4 in the installed state. On its outer circumference, the coupling 10 has a stop projection 5 over a portion of its height, working together with the stop 6 on the cartridge casing 7. This stop 6 limits the rotation of the spindle 3 in the installed state of the sanitary mixing and cutoff valve. The pitch of gearing 9, 11 may be 10°, for example, so that the stop projection 5 can be offset by an angle of 10° by pulling the coupling 10 off the fixed part 8, rotating it and replacing it again in order to adjust the hot water stop. It is very difficult to manufacture a pitch of less than 10° for the gearing 9, 11, so that only a rough adjustment of the stop projection 5 for the gearing is possible. On its end facing away from the cartridge casing 7, the coupling 10 also has a second stop projection 15 over a portion of its height, cooperating with stop 6 on cartridge casing 7 when coupling 10 is rotated, i.e., placed on the fixed part 8 of the driving element 4 in the other direction. The active stop surfaces 13 and 14 of stop projections 5 and 15 are offset by 5° in the present example, so that an adjustment of the hot water stop in 5° increments is possible for the choice of the positions of the gearing 9 and 11 relative to one another and the choice of the direction in which the coupling 10 is placed on the fixed part 8.

Figure 2:
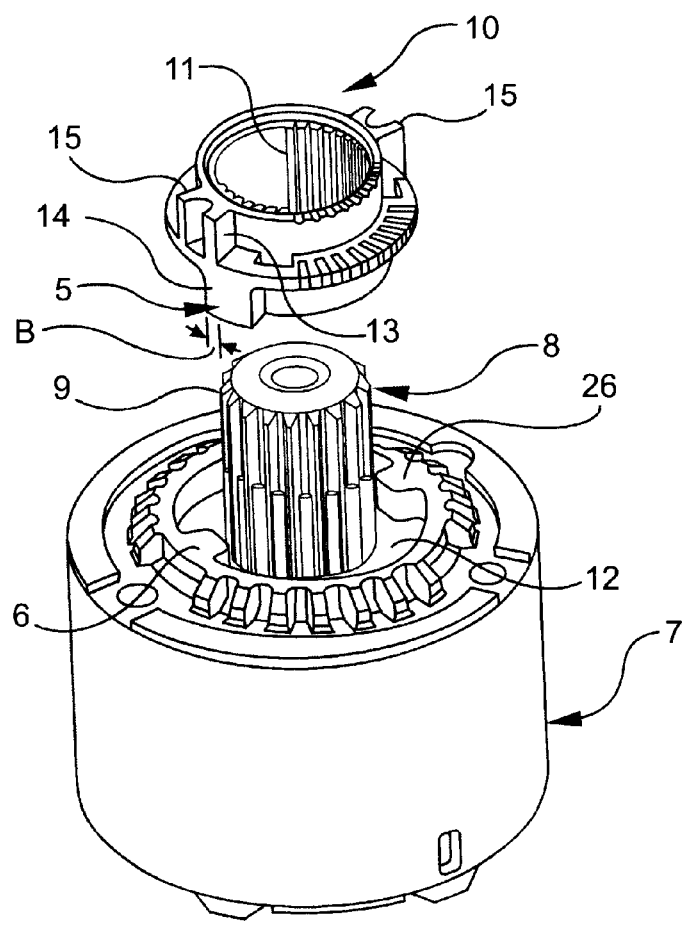
FIG. 2 shows a cartridge of the invention with the coupling removed.

FIG. 2 shows the cartridge in the installed state. The fixed part 8 of the driving element 4 having gearing 9 on its outer surface projects out of the cartridge casing 7 through the central opening 12. Coupling 10 is shown in its state after being removed. On its inside surface, it has a gearing 11 which is provided for meshing with the gearing 9 on the fixed part 8 of the driving element 4. Coupling 10 has a total of four stop projections 5, 15, two of which, 15, are arranged in diametric opposition in the upper half of coupling 10 and two of which, 5, are arranged in diametric opposition in the lower half of coupling 10. Coupling 10 can then be placed on the fixed part 8 of the driving element 4 by meshing the gearing 11 with gearing 9, so that the stop surface 14 is opposite the lateral stop surface of the stop 6 in cartridge casing 7. The coupling 10 and thus the entire driving element 4 as well as the movable valve disk 2 can thus be rotated to the extent allowed by the stop projection 5 between the two stops 6, 26 arranged diametrically opposite one another so they project into the opening 12. However, the coupling 10 may also be rotated so that instead of stop projection 5, stop projection 15 with its stop surface 13 projects into the area between the stops 6, 26 and limits rotation of the coupling by contact of stop surface 13 with stop 6. Stop surfaces 13 and 14 are offset relative to one another, so that rotating the coupling 10 causes the angle of rotation to be shifted by the angle β. If gearings 9 and 11 have a pitch of 10°, for example, and the offset β amounts to 5°, then the range of rotation can be shifted in 5° increments, depending on the meshing of gearing 9 with gearing 11 and the direction in which the coupling is placed on the fixed part 8 of driving element 4.

Figure 3:
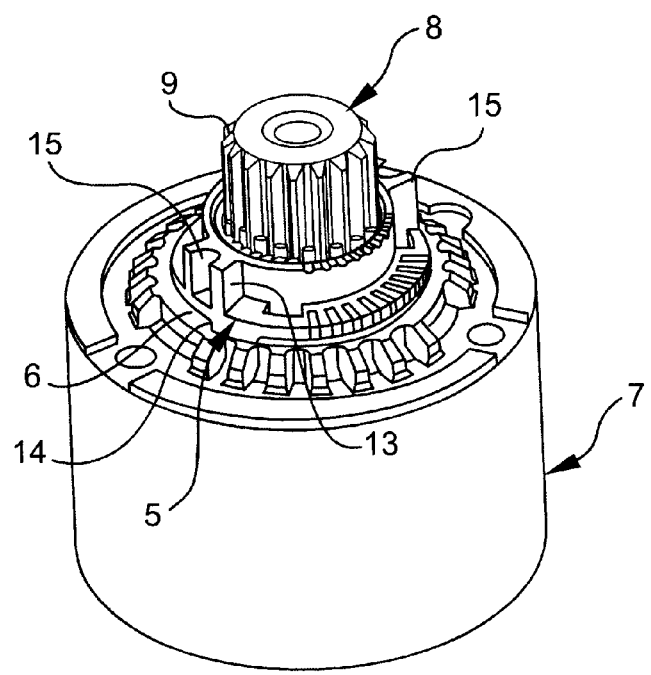
FIG. 3 shows the cartridge of FIG. 2 with the coupling installed.

FIG. 3 shows the cartridge in the completely installed state, i.e., coupling 10 has been placed on fixed part 8 of driving element 4. At its stop surface 14, stop projection 5 is in contact with stop 6 of the cartridge casing 7. In the position illustrated here, the hottest possible mixed water flows through the mixing valve. If the temperature of this hottest possible mixed water is too high or too low, this can be corrected by removing the coupling 10 from the fixed part 8 of the driving element 4 and replacing it after an offset. Optionally an intermediate step may also be set by rotation of the coupling.

Figure 4:
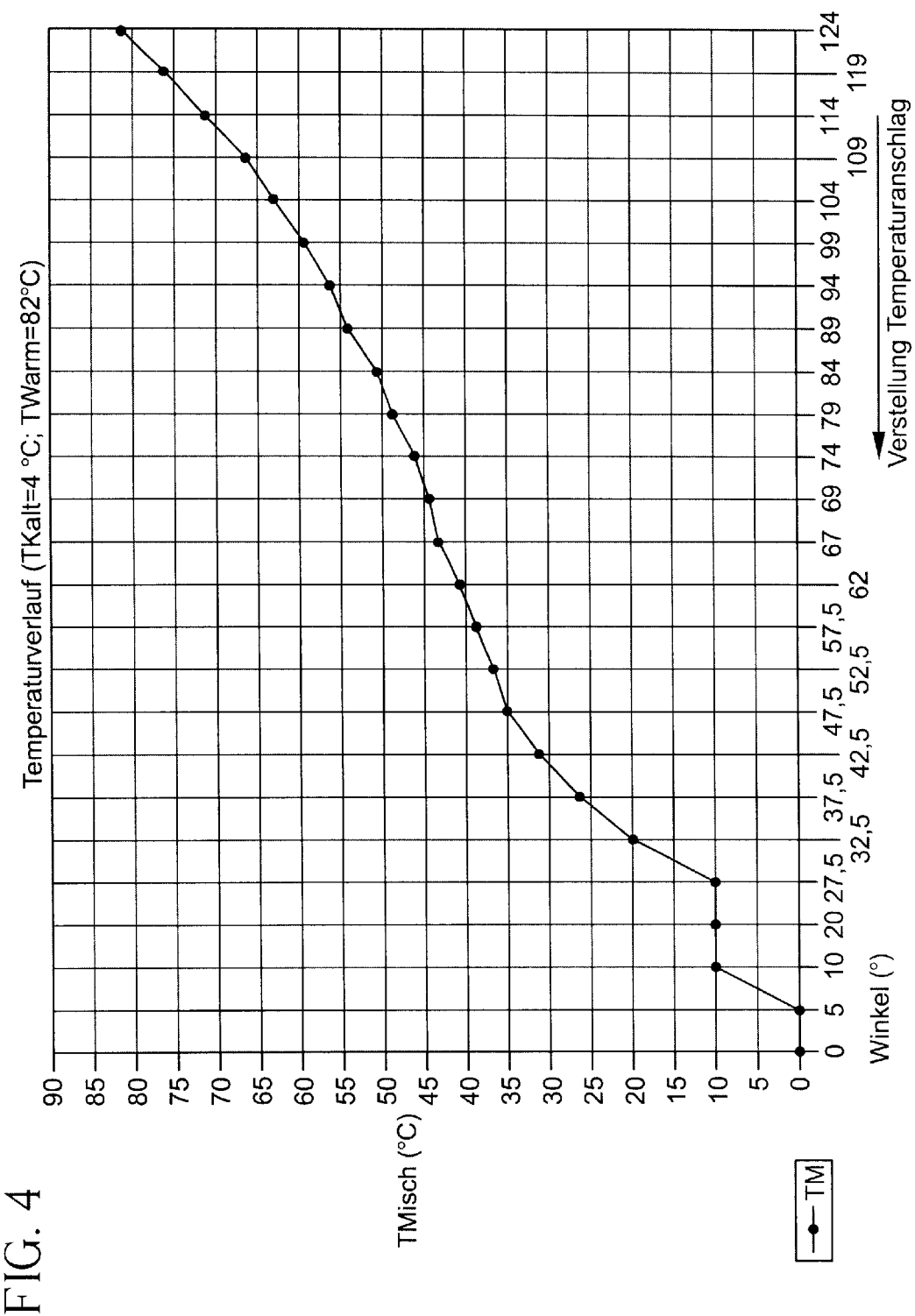
FIG. 4 shows the temperature curve of water issuing from the valve with inlet cold water at 4° C. and inlet hot water at 82° C.

FIG. 4 shows the temperature curve of a mixing valve, where the temperature of the cold water supplied is 4° C. and the temperature of the hot water supplied is 82° C. As this shows, the mixing valve allows rotation of the movable valve disk by 124°. Between 0° and 5°, the valve is completely closed, and the disk is rotated further so that first cold water, then mixed water and finally hot water up to a temperature if 82° C. is obtained at an angle of 124°. In other words, in the case of the mixing valve used for this study, the valve disk could be rotated to such an extent that the cold water opening is in fact closed at the top of the range of hot water removal. To now establish an upper limit for the temperature of the mixed water coming out of the mixing valve if the mixing valve is equipped with the driving element according to this invention, coupling 10 can be offset with respect to the fixed part 8 of the driving element 4, so that stop projections 5, 15 on the driving element cooperate with stops 6, 26 on the housing 7, so that the angle of rotation and thus the maximum temperature are limited.

The desired maximum temperature will be between 40° C. and 60° C., depending on where the mixing valve is used. As FIG. 4 shows, rotation of the movable valve disk by 10° in this range results in a temperature increase by 5° C. If the gearing of fixed part 8 of the driving element 4 and coupling 10 has a pitch of 10° and if the offset between the two stop surfaces 13, 14 is 5°, then the maximum temperature of the mixing valve can be adjusted in 2.5° C. increments by using such a mixing valve. For example, if the maximum temperature is set at 50° C., the rotation would have to be limited to 84° C. with the help of the stop. According to the curve given here, this corresponds to a temperature of 51° C.

Figure 5:
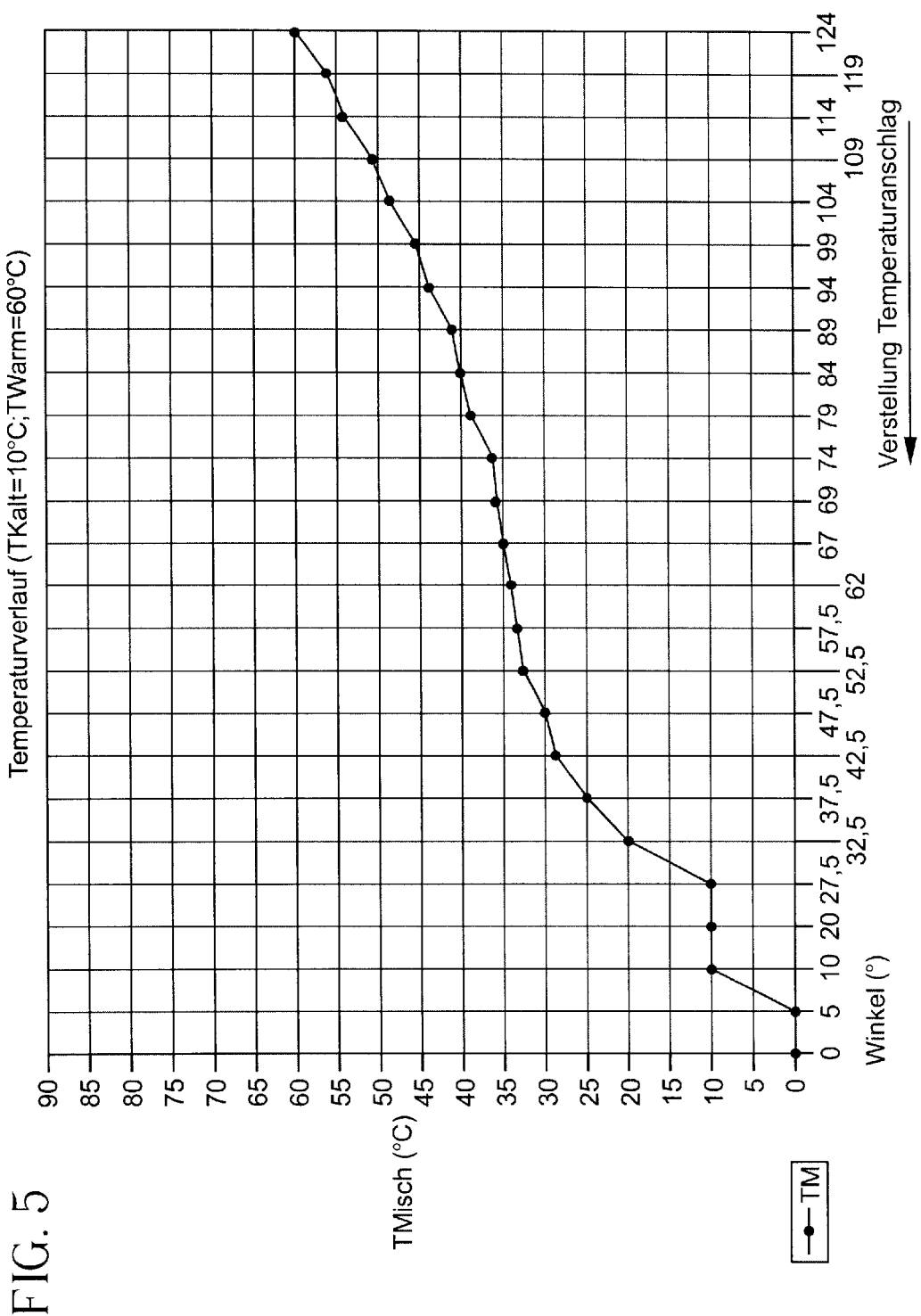
FIG. 5 shows the temperature curve of water issuing from the valve with inlet cold water at 10° C. and inlet hot water at 60° C.

Finally, FIG. 5 shows the temperature curve of the mixed water obtained from a mixing valve under different starting conditions, namely an incoming cold water temperature of 10° C. and an outgoing hot water temperature of 60° C. It can be seen here that the mixing valve used here can be operated from the closed state to pure cold water and mixed water to pure hot water if the temperature stop is on the outermost end. If the mixing valve is limited to a rotation of 84° C., as in the preceding example, then the maximum hot water temperature would be 40° C., but this would be too cold for certain applications such as a kitchen fitting. To set the desired 50° C. as the maximum temperature, rotation would have to be limited to 109°, given these starting conditions.

The two examples presented here show clearly that the mixing valve according to this invention offers a great deal of convenience by making it easy to limit the maximum temperature of the mixed water obtained from the faucet by using this valve and also to adjust it individually to given conditions.

What is claimed is:
1. A sanitary mixing valve having a first disk and a second disk (1, 2) arranged in a cartridge casing (7), the first disk is rotationally fixed, the second disk can be rotated by means of a driving element (4) provided on a spindle (3), the driving element (4) comprises a part (8), which is fixedly connected with the spindle (3) and has a gearing (9) on at least one area of its outer circumference, and a coupling (10), which has on its inner circumferential surface a gearing (11) which, in the installed state, engages the gearing (9) of the part (8) of the driving element (4), the coupling (10) having at least one stop projection (5, 15) which limits the rotational movement of the driving element (4) in cooperation with at least one stop (6, 26) on the cartridge casing (7), wherein, at least one first stop projection (5) extends over a portion of the height of the coupling (10), and at least one second stop projection (15) extends over another portion of the height of the coupling (10), a stop surface (13) of the stop projection (15) having an offset (β) relative to a stop surface (14) of the first stop projection (5); the coupling (10) is engageable with the part (8) of the driving element (4) in two different directions, and the first and second stop projections (5, 15) alternatively cooperate with the stop (6) provided on the cartridge casing (7) in the two different directions.

2. The valve according to claim 1, wherein, in the installed state, the part (8) of the driving element (4) with the area having the gearing (9) projects out of the cartridge casing (7) through a central opening (12) in the cartridge cover, the coupling (10) is placed on the part (8) from the outside, and a minimum of one stop projection (5, 15) is engageable in the central opening into which the fixed stop (6, 26) extend radially with the cartridge casing (7).

3. The valve according to claim 1, wherein, the pitch of the gearing (9, 11) on the outer circumference of the part (8) of the driving element (4) and on the inner circumferential surface of the coupling (10) is 10°.

4. The valve according to claim 1, wherein, the offset (β) amounts to half of the pitch of gearing (9) on the outer circumference of the part (8) of the driving element (4) and the gearing (11) on the inner circumferential surface of the coupling (10).

5. The valve according to claim 2, wherein, the pitch of the gearing (9, 11) on the outer circumference of the part (8) of the driving element (4) and on the inner circumferential surface of the coupling (10) is 10°.

6. The valve according to claim 2, wherein, the offset (β) amounts to half of the pitch of gearing (9) on the outer circumference of the part (8) of the driving element (4) and the gearing (11) on the inner circumferential surface of the coupling (10).

7. The valve according to claim 3, wherein, the offset (β) amounts to half of the pitch of gearing (9) on the outer circumference of the part (8) of the driving element (4) and the gearing (11) on the inner circumferential surface of the coupling (10).

8. The valve according to claim 5, wherein, the offset (β) amounts to half of the pitch of gearing (9) on the outer circumference of the part (8) of the driving element (4) and the gearing (11) on the inner circumferential surface of the coupling (10).

* * * * *